Aug. 21, 1956  F. C. DAVIS  2,759,524
METHODS AND APPARATUS FOR FORMING WELDED
JOINTS IN HEAT-FUSIBLE PLASTIC MATERIAL
Filed Jan. 17, 1952  3 Sheets-Sheet 1

INVENTOR.
FORD C. DAVIS
BY
William Cleland
ATTORNEY

Aug. 21, 1956 F. C. DAVIS 2,759,524
METHODS AND APPARATUS FOR FORMING WELDED
JOINTS IN HEAT-FUSIBLE PLASTIC MATERIAL
Filed Jan. 17, 1952 3 Sheets-Sheet 2
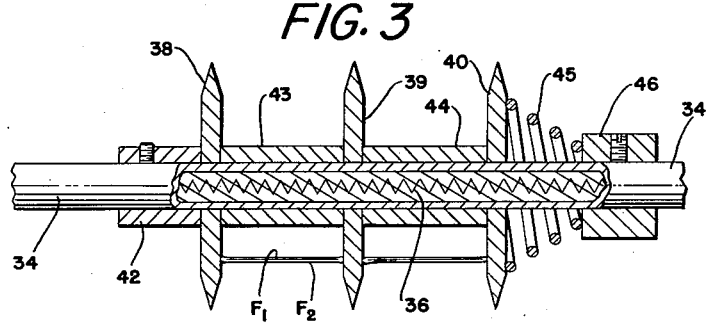
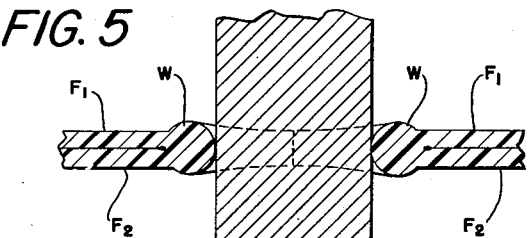
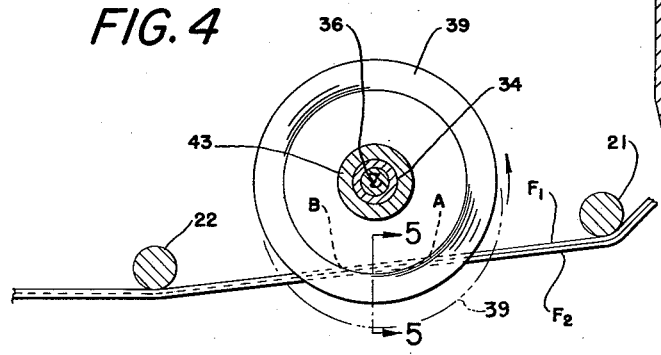
INVENTOR.
FORD C. DAVIS
BY
William Cleland
ATTORNEY Aug. 21, 1956 F. C. DAVIS 2,759,524
METHODS AND APPARATUS FOR FORMING WELDED
JOINTS IN HEAT-FUSIBLE PLASTIC MATERIAL
Filed Jan. 17, 1952 3 Sheets-Sheet 3

INVENTOR.
FORD C. DAVIS
BY William Cleland
ATTORNEY

United States Patent Office 2,759,524
Patented Aug. 21, 1956

2,759,524

METHODS AND APPARATUS FOR FORMING WELDED JOINTS IN HEAT-FUSIBLE PLASTIC MATERIAL

Ford C. Davis, Alliance, Ohio

Application January 17, 1952, Serial No. 266,988

26 Claims. (Cl. 154—42)

This invention relates to methods and apparatus for forming welded joints in thin, heat-fusible plastic material, and particularly in the manufacture of tubular material of the type used for making bags.

The method has particular utility in connection with heat-sealing a type of synthetic resin material known as polyethylene film, which has been heretofore found difficult because of the narrow range at which fusion can be accomplished without melting and thinning the material, and because the resin in fusible condition is in low strength and adherent to metal. Clamp or jaw-type sealers have a tendency to extrude the material when overheated or if the clamping pressure is too great. Other known types of sealers have required the use of slip sheets to confine the area of fusion of the resin, or have been objectionable because of non-uniform temperatures with consequent non-uniformity of fusion along the joints in continuous sealing operations.

One object of the invention is to provide a method and apparatus for forming continuous welded joints in heat-fusible plastic material of the character described, wherein is obviated the usual difficulty of the material adhering to heated metal sealers contacting the same, and by which the resulting continuous joints are uniform in bonding strength and appearance.

Another object of the invention is to provide an improved method and apparatus for making continuous tubular material, from thin sheets of plastic stock of the character described, the marginal edges of the tubular material having uniformly beaded edges.

Still another object of the invention is to provide continuous tubing from heat-fusible plastic material without use of pressure which tends to extrude the material and thereby reduce the thickness of the product at the joints, and without the use of slip sheets to prevent fusion beyond portions desired to be bonded or joined.

Other objects of the invention will be manifest from the following brief description and the accompanying drawings.

Of the accompanying drawings:

Figure 3 is a fragmentary enlarged view, partly broken away and in section, of the heat-sealing unit, substantially as viewed on the line 3—3 of Figure 1.

Figure 4 is a cross-section, on the same scale as Figure 3, taken substantially on the line 4—4 of Figure 1.

Figure 5 is a still further enlarged fragmentary cross-section, taken substantially on the line 5—5 of Figure 4.

Figures 1, 2:
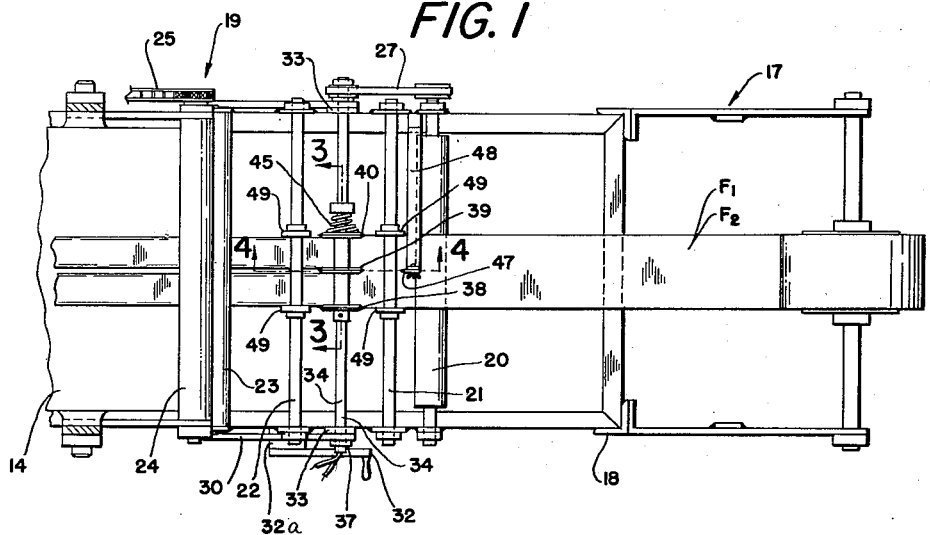
Figure 1 is a top plan view, partly broken away, of a machine for making one form of tubular material from sheets of heat-fusible stock.
Figure 2 is a side elevation thereof.
Figure 6:
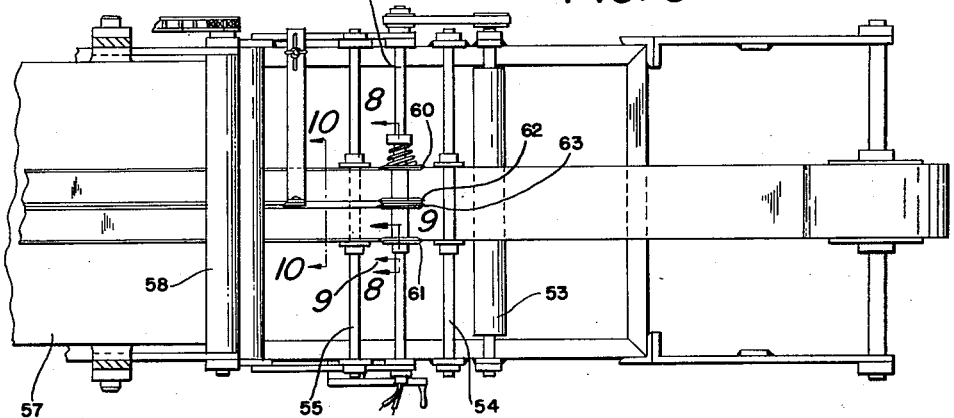
Figure 6 is a top plan view, similar to Figure 1, illustrating a modified form of the invention.
Figure 7:
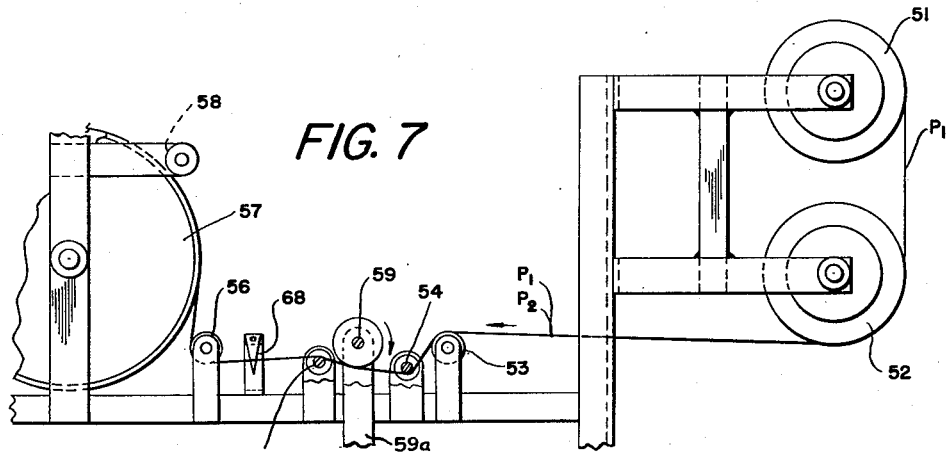
Figure 7 is a side elevation of Figure 6.

Referring to Figures 1 to 5, the numerals 15 and 16 designate separate rolls of thin, heat-fusible, plastic film, $F_1$ and $F_2$, rotatably mounted on a bracket 17 at one end of a framework 18 of a bag making machine, indicated generally at 19. The film from the two rolls is guided in accurately superposed, contacting relation, over an idler roller 20, under longitudinally spaced tensioning and centering rods 21 and 22, under an idler roller 23, and over a relatively large drum 14 of a cross-sealing device (not shown), the stock being drawn from the rolls 15 and 16 by a driven roller 24 frictionally engaging the stock against the drum, and thereby also to rotate the drum. The roller 24 is driven by a continuous chain 25 driven by a sprocket 26 of a gear reducer, in turn driven by a chain drive 27 from a motor 28.

A bracket 30 is pivoted at 31 to a portion of the framework, whereby the bracket is vertically adjustable by means of a suitable manually operable adjusting device 32, and has upstanding bearings 33, 33 between which a shaft 34 is rotatably mounted to be intermediate the guide rods 21 and 22, said shaft being driven in a counter-clockwise direction as viewed in Figures 2 and 4, as by means of a chain drive 35 from motor 28.

The shaft 34 is hollow and contains a heating element 36 of known type, electrically connected, through a suitable slip-ring device 37, to a source of electric current. Mounted on this shaft in predetermined laterally spaced relation are flat sided discs 38, 39, and 40, having tapered edges providing pointed, though bluntly rounded, outer peripheral edge portions. The discs are shown removably and interchangeably mounted in said laterally spaced relation by means of a collar 42 fixed on the shaft to be against the outer face of disc 38, tubular spacers 43 and 44 between the adjacent discs, and a coil spring 45 engaged between outer disc 40 and a collar 46 fixed on the shaft 34. The arrangement is such that the number and spacing of the discs may be varied by means of different spacers. The discs are heated by the heating element 36 for heat-sealing operations to be described later.

A knife 47 is adjustably and removably mounted on an arm 48 secured to the framework to slit the double layer of material into two double strips, which are guided by laterally spaced flanges 49, 49 on the rods 21 and 22, to provide separate reaches of the moving material co-extending between the said rods. Thus, the otherwise unsupported reaches of strips are guided between adjacent flat faces of the discs, the distances between these faces being the same or slightly less than the widths of the strips. For example, the widths of the strips may be approximately the same as the distances between central planes of the discs.

In use of the apparatus to employ the method the superposed sheets $F_1$, $F_2$ of polyethylene film are continuously conveyed from the rolls 15 and 16 thereof to the drum 14, thereby providing two continuously moving reaches of the strips between the guide rods 21 and 22, the adjusting means 32 being adjusted to set the shaft 34 in vertical position in which the contacting edges of the strips engage the flat faces of the discs at points which define chords A–B of substantial length (see Figure 4). The discs are heated to a sufficiently high temperature to maintain a substantially uniform fusion temperature of the resin film (221° F. to 227° F.) at or outwardly closely adjacent the flat faces of the discs. At the points of first contact A of the contacting edges with the flat faces of the discs the fusion of the material begins to take place, and this fusion continues in a straight line across the area A–B, thereby assuring uniform fusion of said contacting edges into neat welded joints W of bead form. Uniformity of the beaded joint is attained by the fact that uniform fusing temperature is maintained to a distance outwardly of the flat faces of the discs approximating the diameters of the beads, as shown in Figure 5.

Rotation of the shaft 34 at 800 R. P. M., as an example, in direction opposed to movement of the film strips, moving at eight feet per minute in the opposite direction at point of contact, is effective to provide a wiping action which obviates any tendency for the film to stick to the surfaces of the disc, and hence uniformity of the welded joint may be maintained continuously.

Referring now to the embodiment of the invention shown in Figures 6 to 10, as before, superposed sheets $P_1$ and $P_2$ of polyethylene film are drawn from rolls 51 and 52 thereof, over a guide roller 53, under a guide and tensioning rod 54, and upwardly at an inclination and over a guide and tensioning rod 55, under an idler roller 56 and over a drum 57 of a cross-sealing device (not shown). The stock is adapted to be continuously drawn from the rolls 51 and 52 by a roller 58, driven in the same manner as roller 24, frictionally engaging the film against the drum 57 to rotate the same, thereby continuously maintaining a reach of tensioned material between the rods 54 and 55.

A shaft 59, mounted on a vertically adjustable bracket 59a similar to the bracket 30 best shown in Figure 2, contains an electrical heating element, as described above, and has removably mounted thereon in laterally spaced relation a plurality of discs 60, 61, 62 and 63 adapted to be heated by the heating element. The discs have tapered peripheral portions terminating in a rounded peripheral edges which engage the tensioned contacting layers of film at a point closely adjacent the rod 54 to apply some degree of additional tensioning pressure to the film at the points of contact of the discs, at which the film is otherwise unsupported.

Figure 10:
Figure 10 is a cross-section on the same scale, taken on the line 10—10 of Figure 6, showing the welded joints.
Figure 8:
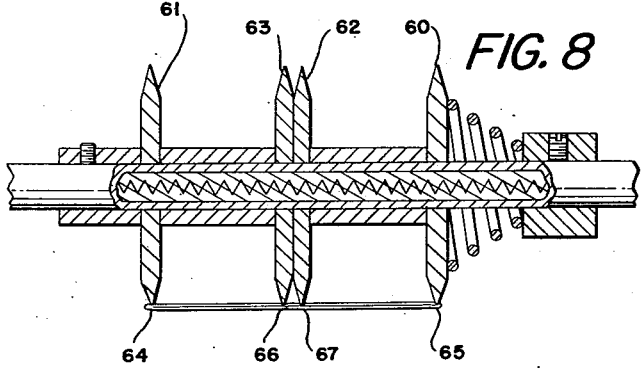
Figure 8 is a fragmentary enlarged view, similar to Figure 3, taken substantially on the line 8—8 of Figure 6.
Figure 9:
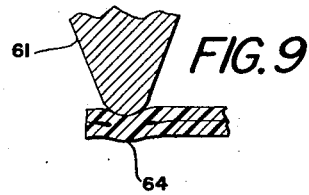
Figure 9 is a further enlarged cross-section taken substantially on the line 9—9 of Figure 6.

The discs as shown are arranged for making continuous tubular material for use in making plastic film containers. Accordingly, heated outer discs 60 and 61 are positioned to engage superposed layers of film closely adjacent the marginal edges thereof and thereby weld continuous joints 64 and 65, as illustrated in Figures 9 and 10, and the two heated intermediate discs 62 and 63 are positioned to provide closely adjacent, similarly welded joints 66 and 67 centrally of the material (see Figure 10). For separating the welded material into two tubes, a suitable knife 68 may be provided at a point between tensioning rod 55 and idler roller 56, to slit the welded or sealed stock between the central joints 66 and 67.

In use of the equipment described in connection with Figures 6 to 10, a double layer of polyethylene film, for example, is continuously drawn from the rolls to maintain a tensioned reach thereof between the rods 54 and 55, and the shaft is adjusted to apply slight further tensioning pressure between the edges of the discs 60 to 63 and the otherwise unsupported film, that is, without breaking through. The discs, being heated to suitable temperature above the fusion temperature of the resin film (221° F. to 227° F.), thereby fuse continuous parallel seams or joints 64, 65, 66 and 67, as shown in Figures 9 and 10. Knife 68 slits the thus jointed layers between the central joints 66 and 67, to divide the stock into two continuous tubes, which are formed into containers of known manner. By this method, layers are integrally welded or bonded along the joints without thinning or weakening the material. It has been found that a highly satisfactory product having uniformly smooth joints is obtainable by rotating the discs in clockwise direction as viewed in Figure 7, thereby applying a wiping action in the same general direction as the movement of the film which obviates the tendency of the film to stick to the hot discs. For this purpose the linear speed of the peripheral edges of the discs may, for example, approximate fifteen times the linear speed of the stock.

Although the above methods have been described particularly for use in sealing polyethylene film, or films which at fusing temperatures have a strong tendency to stick to the heat-sealing elements, the methods in general may be used for sealing any material which is capable of being heat-bonded at fusing temperature thereof without necessarily requiring application of substantial pressure at the same time. An example of such a material is a rubber hydrogen chloride film, known by the trademark "Pliofilm."

Other modifications of the invention may be resorted to without departing from the spirit thereof or the scope of the appended claims.

What is claimed is:

1. Apparatus for forming welded joints along contacting edges of thin sheets of heat-fusible plastic material, comprising means for guiding superposed sheets of the material along a path presenting a reach of straight contacting marginal edge portions thereof in substantially taut and otherwise unsupported condition at a given point, a relatively fixed heating element at said point having a flat heated surface contiguous with respect to said unsupported marginal edge portions of the advancing reach, whereby said edge portions are progressively fused into a welded joint of predetermined uniform extent.

2. Apparatus as set forth in claim 1, said heating element comprising a disc, and said heated surface being a flat side of the disc.

3. Apparatus as set forth in claim 2, means being provided for revolving said disc.

4. Apparatus for forming welded joints along contacting edges of continuous thin sheets of heat-fusible plastic material, comprising means for conveying superposed sheets of the material along a path, means for slitting the advancing material to provide a plurality of strips having contacting marginal edge portions, means for guiding the strips to present straight reaches of at least said contacting marginal edge portions in substantially taut and otherwise unsupported condition at given points, and relatively fixed heating elements at said given points having flat heated surface portions contiguous with respect to said unsupported contacting edge portions, whereby said contacting edge portions are progressively fused into continuous welded joints.

5. Apparatus as set forth in claim 4, said heating elements being spaced heated discs providing the welded joints at opposite marginal edges of the strips to form the same into tubular material.

6. Apparatus as set forth in claim 5, means being provided for revolving said discs oppositely to the direction of advancement of the plastic material at the point of said fusion of the contacting edge portions.

7. Apparatus for forming welded joints along contacting edges of thin sheets of heat-fusible plastic material, comprising a conveyor for advancing superposed sheets of the material along a path, a rotatable disc mounted in relatively fixed position in said path, said disc having flat opposite surfaces, a sharp cutting tool adapted to cut through the material to provide opposed pairs of contacting marginal edge portions prior to advancement thereof toward said disc, means for heating said disc, and guides maintaining the advancing material to present at least said marginal edge portions in a plane containing a chord across said flat surfaces of the disc, whereby said advancing edge portions are maintained contiguous to said flat surfaces and are progressively fused into welded joints by the heat therefrom.

8. Apparatus as set forth in claim 7, means being provided for rotating said disc oppositely to the direction of advancement of the material at the point of said fusion of the contacting edge portions.

9. A method of forming a welded joint along contacting portions of superposed thin sheets of heat-fusible plastic material, comprising the steps of relatively moving the superposed sheets along a path while maintaining the moving material under tension along a reach thereof between spaced points and otherwise unsupported between said spaced points, and engaging said contacting portions of said unsupported reach between the spaced points with a moving surface of a rotating heated disc, the effective linear speed of said moving surface of said disc being different than the linear speed of the moving material to provide a wiping action thereon.

10. A method of forming a welded joint along contacting portions of superposed thin sheets of heat-fusible plastic material, comprising the steps of relatively moving the superposed sheets along a path while maintaining the moving material under tension along a reach thereof between spaced points and otherwise unsupported between said spaced points, and engaging said contacting portions of said unsupported reach between the spaced points with a blunt peripheral edge of a rotating heated disc against the tension of the material, the linear speed of said peripheral edge being greater than the linear speed of the moving material.

11. A method of forming a welded joint along contacting portions of superposed thin sheets of heat-fusible plastic material, comprising the steps of relatively moving the superposed sheets along a path while maintaining the moving material under tension along a reach thereof between spaced points and otherwise unsupported between said spaced points, and engaging said contacting portions of said unsupported reach between the spaced points with a blunt peripheral edge of a rotating heated disc against the tension of the material, the linear speed of said peripheral edge being greater than the linear speed of the moving material, said engagement of the disc with the material being with sufficient pressure to increase the tension thereon at the point of contact with out cutting the material.

12. A method of forming a welded joint along contacting portions of thin sheets of heat-fusible plastic material, comprising the steps of relatively moving the sheets along a path while maintaining an unsupported reach of the moving material under tension, and engaging said contacting portions of said unsupported reach with a blunt peripheral edge of a rotating heated disc against the tension of the material, the linear speed of said peripheral edge being greater than the linear speed of the moving material, said engagement of the disc with the material being with sufficient pressure to increase the tension thereon at the point of contact without cutting the material, said disc being rotated in the same direction as the movement of the material at point of contact with the same, and the linear speed at the material-contacting periphery of the disc being substantially greater than the linear speed of the material.

13. The method of forming tubular material from thin sheets of heat-fusible plastic material, comprising the steps of relatively moving the sheets along a path while maintaining a reach of tensioned but otherwise unsupported contacting portions of the material, engaging against one broad side of said unsupported portions of the sheets with blunt peripheral edges of spaced discs heated substantially to fusing temperature of the material to provide spaced welded joints along the same, said engagement of the heated discs with the material being with sufficient pressure to increase the tension thereon at the points of contact without cutting the material.

14. The method of forming tubular material from thin sheets of heat-fusible plastic material, comprising the steps of relatively moving the sheets along a path while maintaining a reach of tensioned but otherwise unsupported contacting portions of the material, engaging said spaced unsupported portions with blunt peripheral edges of spaced discs heated substantially to fusing temperature of the material to provide spaced welded joints along the same, said engagement of the heated discs with the material being with sufficient pressure to increase the tension thereon at the points of contact without cutting the material, said discs being rotated in the same direction as the movement of the material at point of contact therewith, and the linear speed at the material-contacting peripheral portions of the discs being substantially greater than the linear speed of the material.

15. A method as set forth in claim 14, including the step of slitting the moving sheets between adjacent joints welded by the discs to separate the sheets into separate strips of superposed layers.

16. Apparatus for forming welded joints along contacting portions of thin sheets of heat-fusible plastic material, comprising means for conveying superposed sheets of the material along a path, means maintaining a reach of the moving material under tension and presenting portions of the sheets in contacting relation but otherwise unsupported, at least one disc heated to fusion temperature of the material and having a peripheral edge tensionally engaging one broad side of said contacting portion of said reach of the material, said tensional engagement of the disc with the material at the point of contact being only sufficient to fuse and form a welded joint without cutting the material.

17. Apparatus as set forth in claim 16, means being provided for rotating said at least one disc in the same direction as the direction of movement of said material at the point of contact therewith.

18. Apparatus for forming welded joints along contacting portions of thin sheets of heat-fusible plastic material, comprising means for conveying superposed sheets of the material along a path, means maintaining a reach of the moving material under tension and presenting portions of the sheets in contacting relation but otherwise unsupported, a rotatable shaft having thereon a plurality of spaced heated discs arranged in pairs thereof, said discs having tapered peripheral portions defining rounded peripheral edges for yieldingly tensionally engaging one broad side of said contacting portions of said reach at correspondingly spaced points without cutting through the material, whereby the material at said spaced points is progressively fused to form continuous welded joints.

19. Apparatus for forming welded joints along contacting portions of thin sheets of heat-fusible plastic material, comprising means for conveying superposed sheets of the material along a path, means maintaining a reach of the moving material under tension and presenting portions of the sheets in contacting relation but otherwise unsupported, a rotatable shaft having thereon a plurality of spaced heated discs arranged in pairs thereof, said discs having tapered peripheral portions defining rounded peripheral edges for yieldingly tensionally engaging one broad side of said contacting portions of said reach at correspondingly spaced points without cutting through the material, whereby the material at said spaced points is progressively fused to form continuous welded joints, means being provided for slitting said welded material between adjacent ones of said welded joints to separate the material into tubular stock defined by spaced welded joints.

20. Apparatus for forming welded joints along contacting portions of thin sheets of heat-fusible plastic material, comprising means for conveying superposed sheets of the material along a path, means maintaining a reach of the moving material under tension and presenting portions of the sheets in contacting relation but otherwise unsupported, a rotatable shaft having thereon a plurality of spaced heated discs arranged in pairs thereof, said discs having tapered peripheral portions defining rounded peripheral edges for yieldingly tensionally engaging one broad side of said contacting portions of said reach at correspondingly spaced points without cutting through the material, whereby the material at said spaced joints is progressively fused to form continuous welded joints, means being provided to rotate said discs in the same direction as the direction of movement of said material at the points of contact therewith.

21. The method of forming a continuous welded joint along superposed thin sheets of heat-fusible plastic material, comprising the steps of progressively advancing the superposed sheets to be in taut condition at a point along a path with the portions of the sheets to be welded in superposed contacting relation and otherwise unsupported, while a heated rotatable element relatively fixed in the path of the moving material is rotated to apply continuous wiping pressure to said contacting portions of the taut material progressively to fuse the contacting portions together.

22. The method of forming a welded joint along contacting superposed marginal edge portions of thin sheets of heat-fusible plastic material, comprising the steps of relatively moving the sheets progressively to advance the same in taut condition to present straight superposed, and otherwise unsupported, contacting marginal edges of the sheets edgewise in contiguity with respect to a heated flat surface of a heating element disposed at an angle to a plane of the sheets, and thereby progressively to fuse the superposed edge portions together.

23. The method of forming a welded joint along contacting superposed marginal edge portions of thin sheets of heat-fusible plastic material, comprising the steps of relatively moving the sheets progressively to advance the same in taut condition to present straight superposed, and otherwise unsupported, contacting marginal edges of the sheets edgewise in contiguity with respect to a chord across a flat side face of a disc which is heated to predetermined fusion temperature of said material, and thereby progressively fuse the superposed edge portions together to predetermined uniform extent.

24. The method of forming a welded joint along contacting superposed marginal edge portions of thin sheets of heat-fusible plastic material, comprising the steps of advancing the superposed sheets of material along a path, slitting the advancing material to expose laterally opposed pairs of superposed contacting edge portions of the superposed sheets, and further advancing the slitted material to have at least one pair of said edge portions, while held in taut and otherwise unsupported condition, edgewise in contiguity with respect to flat surface portions of a heated element, and thereby progressively to fuse the superposed contacting edge portions together to predetermined uniform extent.

25. The method of forming a welded joint along contacting superposed marginal edge portions of thin sheets of heat-fusible plastic material, comprising the steps of advancing the superposed sheets of material along a path, slitting the advancing material to expose laterally opposed pairs of superposed contacting edge portions of the superposed sheets, and further advancing the slitted material to have at least one pair of edge portions while held in taut and otherwise unsupported condition, edgewise in contiguity with respect to flat surface portions of a heated disc revolving in direction opposed to the direction of movement of the advancing plastic material at point of contiguity, progressively to fuse the superposed contacting edge portions together to predetermined uniform extent.

26. The method of forming a welded joint along contacting superposed marginal edge portions of thin sheets of heat-fusible plastic material, comprising the steps of advancing the superposed sheets of the material along a path, slitting the advancing material into strips having pairs of contacting edges of the superposed sheets along each side edge thereof, and further advancing the slitted material in taut condition to have otherwise unsupported contacting edge portions thereof edgewise in uniformly close proximity to substantially flat heated surfaces, progressively to fuse the contacting edge portions together to predetermined uniform extent.

References Cited in the file of this patent

UNITED STATES PATENTS

| | | |
|---|---|---|
| 2,232,640 | Schwartzman | Feb. 18, 1941 |
| 2,343,975 | Hosfield | Mar. 14, 1944 |
| 2,444,685 | Waters | July 6, 1948 |
| 2,505,647 | Norris | Apr. 25, 1950 |
| 2,508,128 | Waards | May 16, 1950 |
| 2,510,383 | Dalgleish | June 6, 1950 |
| 2,516,552 | Clark et al. | July 25, 1950 |
| 2,535,029 | Antanasoff et al. | Dec. 26, 1950 |
| 2,556,476 | Lamport | June 12, 1951 |
| 2,579,063 | Andrews | Dec. 18, 1951 |
| 2,660,218 | Johnson et al. | Nov. 24, 1953 |